(12) United States Patent
Ishibashi et al.

(10) Patent No.: US 7,422,239 B2
(45) Date of Patent: Sep. 9, 2008

(54) ENERGY ABSORBING STEERING APPARATUS

(75) Inventors: Yoshinori Ishibashi, Hekinan (JP); Morito Oshita, Kariya (JP); Hidetoshi Inayoshi, Nukata-gun (JP)

(73) Assignee: Aisin Seiki Kabushiki Kaisha, Kariya-Shi, Aichi-Ken (JP)

( * ) Notice: Subject to any disclaimer, the term of this patent is extended or adjusted under 35 U.S.C. 154(b) by 450 days.

(21) Appl. No.: 11/166,214

(22) Filed: Jun. 27, 2005

(65) Prior Publication Data
US 2005/0285382 A1  Dec. 29, 2005

(30) Foreign Application Priority Data
Jun. 28, 2004 (JP) ............... 2004-190401

(51) Int. Cl.
*B62D 1/11* (2006.01)
(52) U.S. Cl. .................. 280/777; 74/492; 188/374
(58) Field of Classification Search ......... 280/777, 280/775; 74/492, 493; 188/374
See application file for complete search history.

(56) References Cited

U.S. PATENT DOCUMENTS 5,961,146 A * 10/1999 Matsumoto et al. ......... 280/777

(Continued)

FOREIGN PATENT DOCUMENTS

| EP | 1 184 253 A1 | 3/2002 |
|---|---|---|
| EP | 1 247 721 A2 | 10/2002 |
| EP | 1 479 593 A1 | 11/2004 |
| JP | 4-113954 A | 4/1992 |
| JP | 2002-362381 | 12/2002 |

OTHER PUBLICATIONS

European Search Report for European Patent Application No. 05013060.8, dated Jul. 5, 2007.

*Primary Examiner*—Christopher Ellis
*Assistant Examiner*—Joseph Rocca
(74) *Attorney, Agent, or Firm*—Buchanan Ingersoll & Rooney PC

(57) ABSTRACT

An energy absorbing steering apparatus for a vehicle includes a support member for supporting a steering column by detachably attaching the steering column to a vehicle body and an energy absorption apparatus for relatively movably supporting the steering column relative to the vehicle body in a frontward direction of the vehicle body. The energy absorbing steering apparatus is designed for absorbing impact energy applied to the steering column. The energy absorption apparatus includes a support pin supported by the steering column, a first absorption member provided along the support pin and having a connection portion provided at one end of the first absorption member and connected to the vehicle body for applying load to the support pin when the support pin moves relative to the support member, a second absorption member provided along the support pin and having a connection portion provided at one end of the second absorption member and connected to the vehicle body for applying load to the support pin when the support pin moves relative to the support member, a connection member connected to the connection portion of the first absorption member and the connection portion of the second absorption member for connecting the first absorption member and the second absorption member to the vehicle body, and a control apparatus for controlling the connection member to change the number of absorption members connected to the vehicle body corresponding to a drive condition.

13 Claims, 6 Drawing Sheets

U.S. PATENT DOCUMENTS

| | | |
|---|---|---|
| 6,322,103 B1 | 11/2001 | Li et al. |
| 6,367,840 B1 * | 4/2002 | Duval et al. .................. 280/777 |
| 6,575,497 B1 * | 6/2003 | McCarthy et al. ........... 280/777 |
| 6,631,924 B2 * | 10/2003 | Nomura et al. ............. 280/777 |
| 6,726,248 B2 * | 4/2004 | Satou et al. .................. 280/777 |
| 6,764,098 B2 | 7/2004 | Matsumoto et al. |
| 2002/0167157 A1 * | 11/2002 | Matsumoto et al. ......... 280/777 |
| 2006/0273569 A1 * | 12/2006 | Manwaring et al. ......... 280/777 |

* cited by examiner

ENERGY ABSORBING STEERING APPARATUS

CROSS REFERENCE TO RELATED APPLICATIONS

This application is based on and claims priority under 35 U.S.C. § 119 to Japanese Patent Application 2004-190401, filed on Jun. 28, 2004, the entire content of which is incorporated herein by reference.

FIELD OF THE INVENTION

This invention generally relates to an energy absorbing steering apparatus.

BACKGROUND

When a vehicle collides with another vehicle or a building, a driver of the vehicle collides with a steering apparatus by inertia force. Conventional energy absorbing steering apparatus includes an energy absorbing apparatus for absorbing the impact energy.

In the energy absorbing steering apparatus of this kind, the steering column is movably supported relative to a vehicle body so that the steering column can move frontward relative to the vehicle when the driver of the vehicle collides with the steering apparatus. The energy absorbing steering apparatus further includes a member for absorbing the impact energy applied from the driver.

However, load applied to the steering column from the driver can be varied from different drive conditions. The load can be varied, for example, when the vehicle is driven by various drivers, because weights of the drivers are varied. Therefore, there is a danger that the energy absorption steering apparatus cannot sufficiently absorb the impact energy applied from the driver to the steering column. For overcoming the problem described above, JP2002-362381A suggests an energy absorbing apparatus in which the amount of impact energy absorbed can be controlled depending on the drive condition. In the energy absorbing steering apparatus, the amount of impact energy absorbed can be controlled by changing a rotational angle of a support pin thereby changing degree of deformation of an energy absorption plate deformed by the support pin.

However, in the steering apparatus described in the document, the rotational angle of the support pin is controlled by a motor. The motor need to have high torque so that the support pin can be removed from the energy absorption plate against counter force. Therefore, the motor tends to become larger size and cause high manufacturing cost. Further, another mechanism for regulating the rotational angle of the support pin is required. As a result, the steering apparatus tends to be still larger size.

A need thus exists for an energy absorbing steering apparatus, in which impact energy can be preferably absorbed under various drive conditions, of simple configuration. The present invention has been made in view of the above circumstances and provides such an energy absorbing steering apparatus for a vehicle.

SUMMARY OF THE INVENTION

According to an aspect of the present invention, an energy absorbing steering apparatus for a vehicle includes a support member for supporting a steering column by detachably attaching the steering column to a vehicle body and an energy absorption apparatus for relatively movably supporting the steering column relative to the vehicle body in a frontward direction of the vehicle body. The energy absorbing steering apparatus is designed for absorbing impact energy applied to the steering column. The energy absorption apparatus includes a support pin supported by the steering column, a first absorption member provided along the support pin and having a connection portion provided at one end of the first absorption member and connected to the vehicle body for applying load to the support pin when the support pin moves relative to the support member, a second absorption member provided along the support pin and having a connection portion provided at one end of the second absorption member and connected to the vehicle body for applying load to the support pin when the support pin moves relative to the support member, a connection member connected to the connection portion of the first absorption member and the connection portion of the second absorption member for connecting the first absorption member and the second absorption member to the vehicle body, and a control apparatus for controlling the connection member to change the number of absorption members connected to the vehicle body corresponding to a drive condition.

BRIEF DESCRIPTION OF THE DRAWINGS

The foregoing and additional features and characteristics of the present invention will become more apparent from the following detailed description considered with reference to the accompanying drawings, wherein.

DETAILED DESCRIPTION

A first embodiment of the present invention will be explained with reference to drawing figures.

Figure 1:
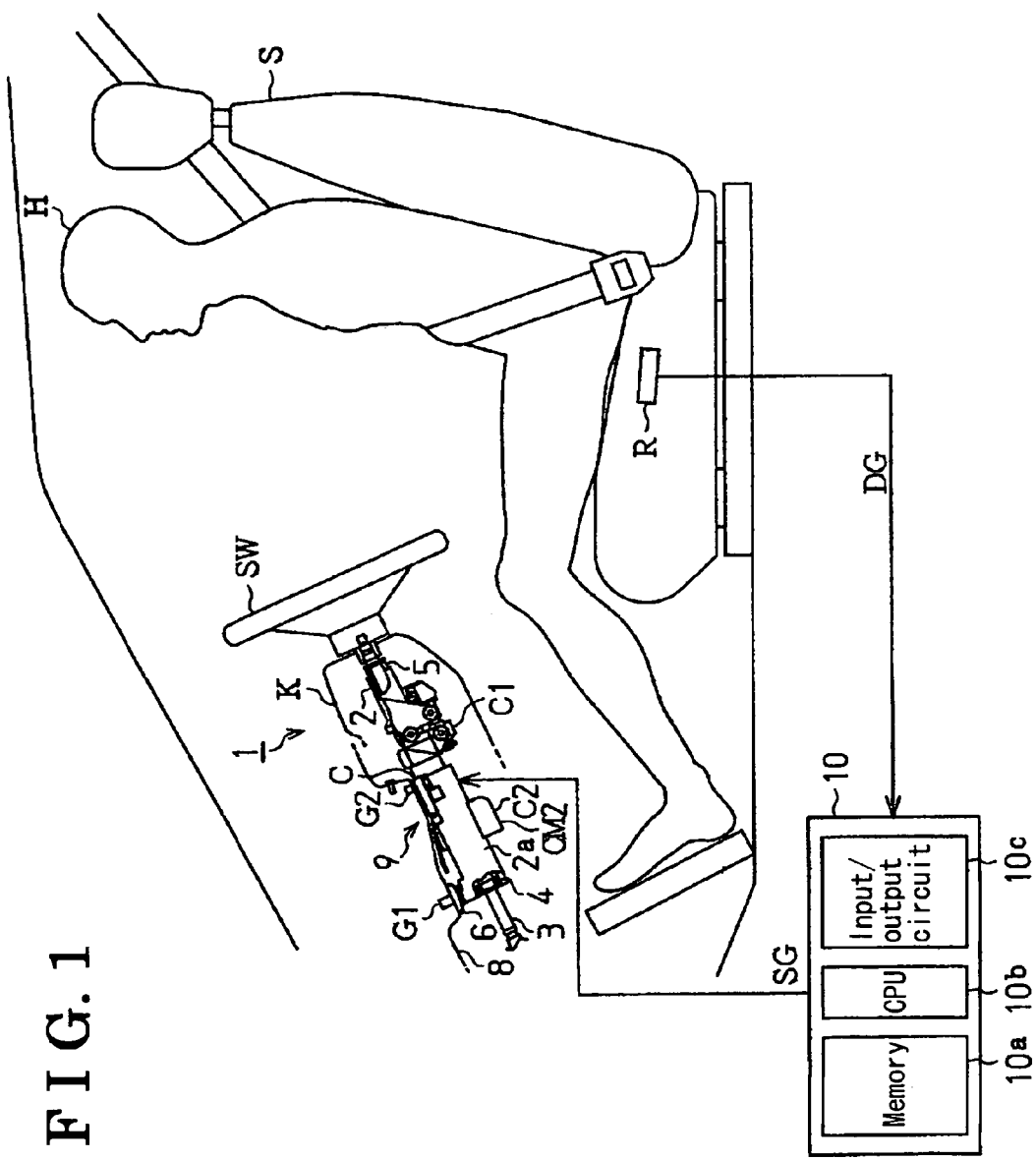
FIG. 1 represents a schematic side view illustrating an energy absorbing steering apparatus according to embodiments of the present invention.

FIG. 1 represents a schematic side view illustrating an energy absorbing steering apparatus (referred to as a steering apparatus in later part) according to the embodiment of the present invention. As illustrated in FIG. 1, the steering apparatus 1 includes a steering column apparatus 2 (steering column) and a steering shaft 3 inserted into the steering column apparatus 2.

The steering column apparatus 2 is accommodated in a column cover K. The steering shaft 3 is rotatably supported by the steering column apparatus 2 through bearings 4 and 5. A steering link (not illustrated) is connected to the front end of the steering shaft 3. A steering wheel SW is attached to the rear end of the steering shaft 3. Here, and also in later part of this document, "front" and "rear" are determined relative to a vehicle.

Further, a column housing 2a is provided at approximately middle portion of the steering column apparatus 2. A first support member 6 is secured to the column housing 2a as a unit with the column housing 2. The first support member 6 is connected to a vehicle body 8 through a bolt G1 so that the steering column 2 is supported by the vehicle body 8. In addition, a second support member 7 (support member, illustrated in later figures) is secured to the rear side of the column housing 2a. The second support member 7 is fixed to the vehicle body 8 through a bolt G2 (connection bolt). Accordingly, the steering column apparatus 2 is supported by the vehicle body 8 through the second support member 7.

The first support member 6 is configured so as to be detached from the vehicle body 8 when a predetermined load is applied to the steering shaft 3 in a frontward longitudinal direction. In addition, the second support member 7 is configured so as to be detached from the column housing 2a when a predetermined load is applied to the steering shaft 3 in a frontward longitudinal direction. As a result, the steering column apparatus 2 is moved frontward when a predetermined load is applied to the steering shaft 3 in a frontward longitudinal direction.

In addition, the column housing 2a includes an energy absorption apparatus 9. The energy absorption apparatus 9 has a function of absorbing impact energy applied to a driver from the steering wheel SW when the steering column apparatus 2 is detached from the vehicle body 8 and moved frontward.

The steering apparatus 1 includes a sensor R as a detection apparatus accommodated in a driver seat S for detecting a weight of a driver H. A detection signal DG emitted by the sensor R is transmitted to a controller 10 provided in the vehicle body 8 through an electric wire (not illustrated).

The controller 10 includes a memory 10a, a central processing unit (CPU) 10b, and an input/output circuit 10c. The memory 10a stores a predetermined standard weight. The controller 10 feeds the detection signal DG through the input/output circuit 10c.

The CPU 10b detects a weight of a driver H through the detection signal DG, and judges whether the weight of the driver H is equal to or more than the standard weight or not. The CPU 10b emits a drive current SG to the steering column apparatus 2 through the input/output circuit 10c corresponding to a judge result. In the embodiment, the CPU 10b emits the drive current SG when the weight of the driver H is less than the standard weight, and not emit the drive current SG when the weight of the driver H is equal to or more than the standard weight. Specifically, for example in the embodiment, the CPU 10b emits the drive current SG to the steering column apparatus 2 when the CPU 10b determines that the weight of the driver H is less than 80 kg, and not emit the drive current SG when the CPU 10b determines that the weight of the driver H is equal to or more than 80 kg.

Further, the steering apparatus 1 includes a tilt mechanism C1. An angle of tilt of the steering apparatus 1 is controlled by driving a motor CM1 (illustrated in FIG. 3) for tilt control of the steering apparatus 1. In addition, the steering apparatus 1 includes a telescopic mechanism C2. The amount of telescopic movement is controlled by driving a motor CM2 for telescopic control of the steering apparatus 1.

Figure 2:
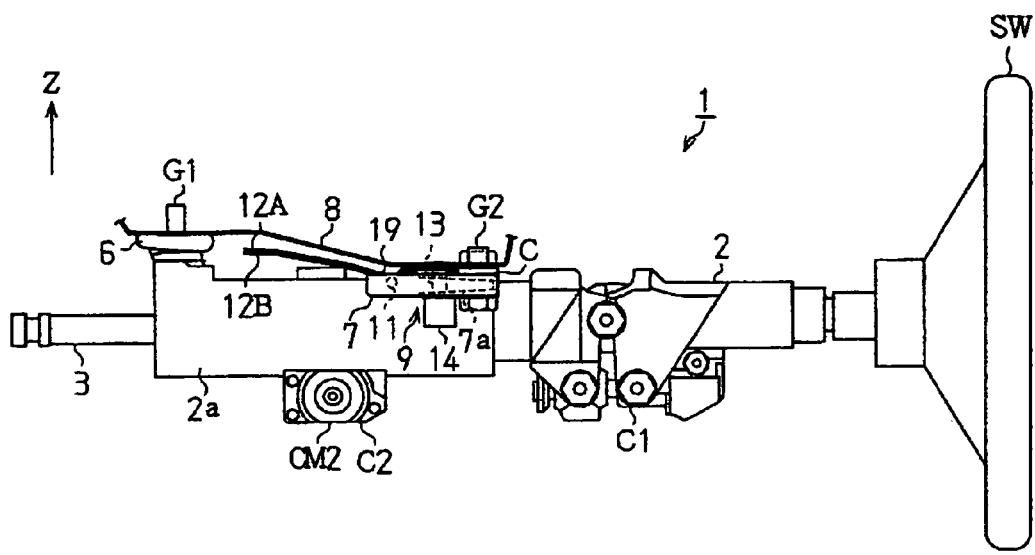
FIG. 2 represents a side view illustrating the steering apparatus according to the embodiments of the present invention.
Figure 3:
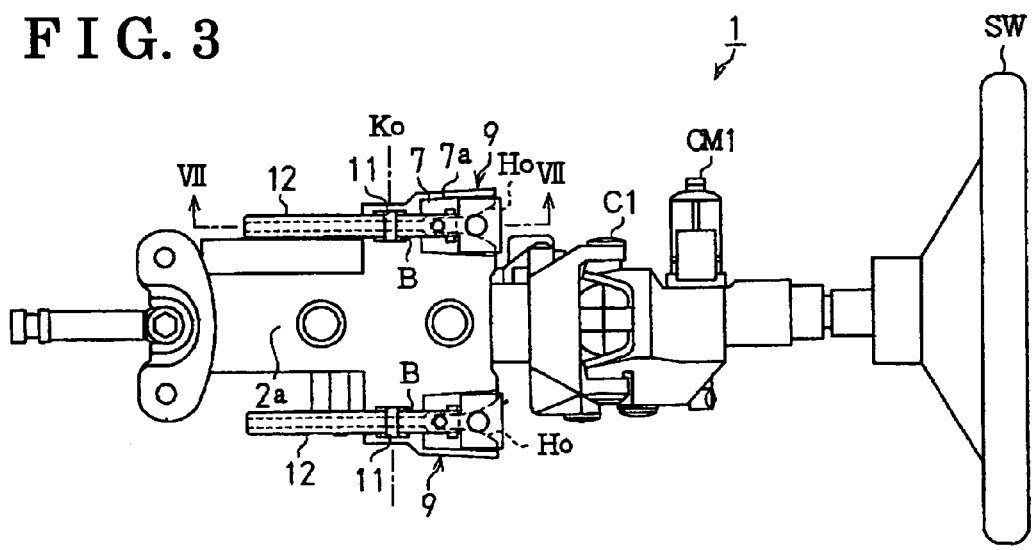
FIG. 3 represents a plane view illustrating the steering apparatus.

Next, a detail of the energy absorption device 9 will be explained with reference to FIG. 2 to FIG. 7. FIG. 2 represents a side view illustrating the steering apparatus 1 according to the embodiment of the present invention. FIG. 3 represents a plane view illustrating the steering apparatus 1.

As illustrated in FIG. 3, in the embodiment, energy absorption apparatuses 9 are provided at both sides of the column housing 2a. As illustrated in FIGS. 2 and 3, each energy absorption device 9 includes an energy absorption pin 11 (referred to an EA pin in later part) as a support pin, an energy absorption member 12, a control pin 13 as a connection member, a pin control device 14 as a control apparatus.

As illustrated in FIG. 3, a recessed portion B is provided at each right and left side of the column housing 2a along a line Ko orthogonal to a longitudinal direction of the steering shaft 3. The EA pin 11 of cylindrical shape is press-fitted in each recessed portion B along the line Ko.

Figure 7:
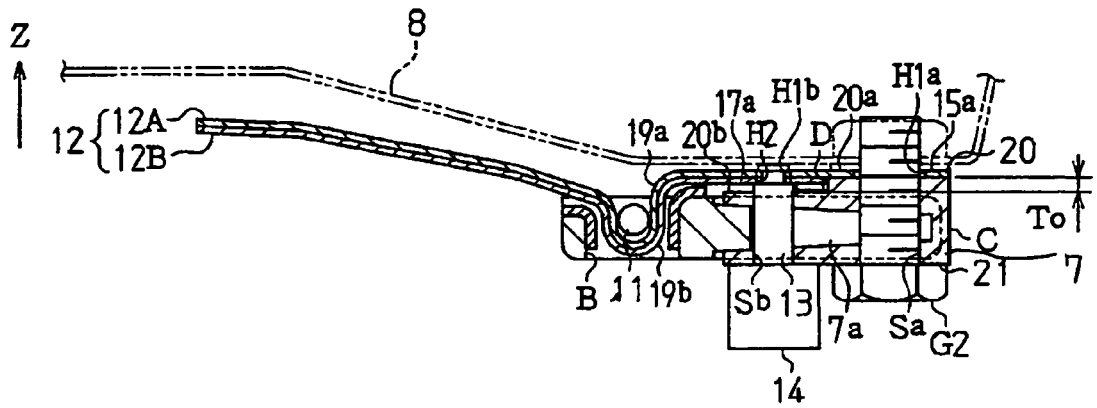
FIG. 7 represents a diagram for explaining an action of a steering apparatus according to a first embodiment of the present invention.
Figure 8:
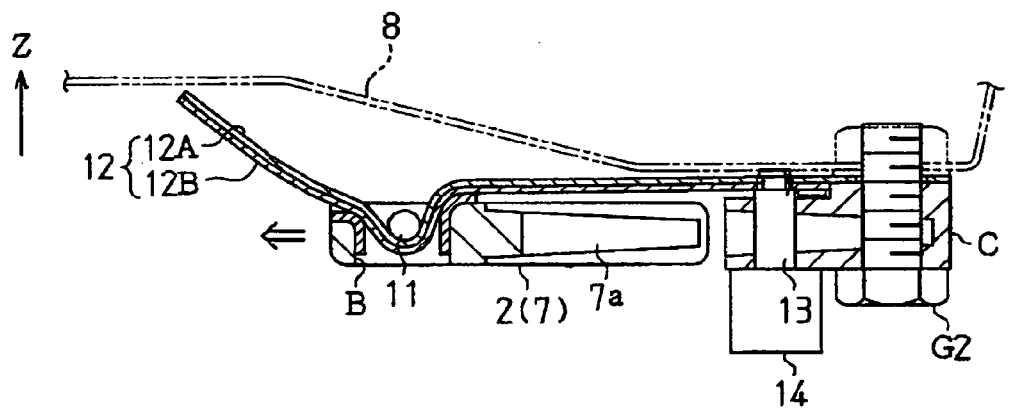
FIG. 8 represents a diagram for explaining an action of the steering apparatus according to the first embodiment of the present invention.

Further, a thin portion 7a having a thickness becoming thinner in a rearward direction, as illustrated in FIGS. 7 and 8, is provided at each side of the column housing 2a. The thin portion 7a is provided at the rear of the recessed portion B provided at each side (steering wheel side), as illustrated in FIGS. 2 and 3. As illustrated in FIG. 3, a groove Ho of U-character shape opening rearward is formed at each thin portion 7a by means of notching.

Figure 4A:
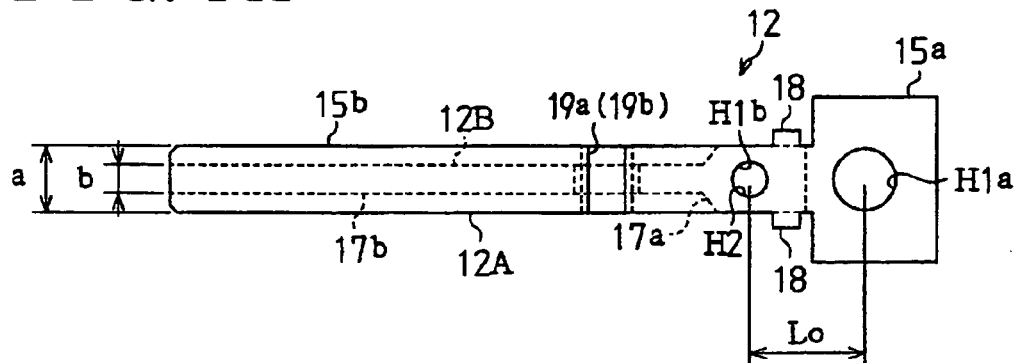
FIG. 4A represents a diagram for explaining an energy absorption apparatus.
Figure 4B:
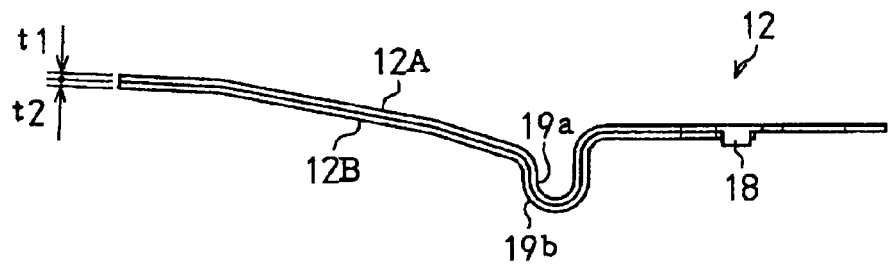
FIG. 4B represents a diagram for explaining the energy absorption apparatus.

The energy absorption member 12 is provided along each recessed portion B as illustrated in FIGS. 2 and 3. As illustrated in FIGS. 4A and 4B, the energy absorption member 12 is configured from two absorption plates 12A and 12B layered together. A first absorption plate 12A is located on a second absorption plate 12B (In other words, the first absorption plate 12A is located at the vehicle body 8 side of the second absorption plate 12B). In addition, a thickness t1 of the first absorption plate 12A is equal to a thickness t2 of the second absorption plate.

The first absorption plate 12A is configured from a base portion 15a of an approximately square shape and a belt-like portion 15b extended frontward from the base portion 15a. A first hole H1a is provided at an approximately middle of the base portion 15a. A second hole H1b is provided at the belt-like portion 15b near the base portion 15a. The second hole H1b is provided at a distance of Lo from the first hole H1a. In addition, a rivet 18 is provided at each right and left side of the belt-like portion 15b of the first absorption plate 12A near the base portion 15a.

The second absorption plate 12B is configured from a base portion 17a of an approximately square shape and a belt-like portion 17b extended from the base portion 17a, as same as in the case of the first absorption plate 12A. In the embodiment, the belt-like portion 17b of the second absorption plate 12B is configured to have a uniform width b narrower than a width a of the belt-like portion 15b of the first absorption plate 12A. In addition, the base portion 17a of the second absorption plate 12B is formed to have a width equal to the width a of the belt-like portion 15b of the first absorption plate 12A. Further, a hole H2 having an inner diameter equal to the second hole H1*b* is formed approximately at a center of the base portion 17*a* of the second absorption plate 12B.

Figure 5:
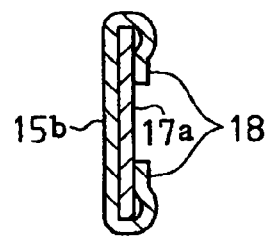
FIG. 5 represents a cross-sectional view illustrating the energy absorption apparatus.

As illustrated in FIG. 5, the second absorption plate 12B is fastened to the first absorption plate 12A by the rivets 18 so that the base portion 17*a* of the second absorption plate 12B is overlapped with the belt-like portion 15*b* of the first absorption plate 12A In this time, the second hole H1*b* formed at the belt-like portion 15*b* of the first absorption plate 12A overlaps with the hole H2 formed at the base portion 17*a* of the second absorption plate 12B. Accordingly, the base portion 17*a* of the second absorption plate 12B is shifted from the base portion 15*a* of the first absorption plate 12A by a distance Lo in a frontward direction.

In addition, the base portion 17*a* of the second absorption plate 12B is fixed by the rivets 18 with a sufficiently small load. Accordingly, when external force (impact) equal to or larger than a predetermined level is applied between the first absorption plate 12A and the second absorption plate 12B, the first absorption plate 12A and the second absorption plate 12B are separated.

Further, as illustrated in FIG. 4B, the belt-like portion 15*b* of the first absorption plate 12A includes a bending portion 19*a*. Similarly, the belt-like portion 17*b* of the second absorption plate 12B includes a bending portion 19*b*. The bending portion 19*a* of the first absorption plate 12A is provided at the front of the second hole H1*b*. The bending portion 19*b* of the second absorption plate 12B is provided at the front of the hole H2.

Then, as illustrated in FIGS. 2 and 3, the absorption plate 12A and the absorption plate 12B configured as described above and fastened together by the rivets 18 are disposed so that the bending portion 19*a* and the bending portion 19*b* are provided under the EA pin 11 secured in the recessed portion B and fitted to the EA pin 11. In this time, the base portion 15*a* of the first absorption plate 12A and the base portion 17*a* of the second absorption plate 12B are disposed on the second support member 7.

The second support member 7 is attached to the thin portion 7*a* of the column housing 2*a*. FIG. 7 represents a cross-sectional view illustrating a schematic portion of the energy absorption apparatus 9 taken on line VII-VII of FIG. 3. As illustrated in FIG. 7, the second support member 7 has a cross-sectional shape configured from approximately two parallel sides and one side connected to both right ends of the two approximately parallel sides. As can be seen from FIG. 7 and configuration described above, the second support member 7 has an opening at the front. The second support member 7 is fitted to the thin portion 7*a* so that the thin portion 7*a* is inserted into the second support member 7 from the opening of the second support member 7.

In addition, a first upper wall 20*a* and a second upper wall 20*b* lower than the first upper wall 20*a* by a difference of height To are provided at an upper wall 20 of the second support member 7. The second upper wall 20*b* is provided at the front of the first upper wall portion 20*a*. The difference of height To is set to be higher than a sum of the thickness t2 of the second absorption plate 12B and the thickness of the rivets 18.

Further, a first penetrating hole Sa is provided at each first upper wall 20*a* and a lower wall 21 facing the first upper wall 20*a* Each first penetrating hole Sa penetrates in an arrow Z direction (vertical direction) in FIG. 7. Further, a second penetrating hole Sb is provided at each second upper wall 20*b* and the lower wall 21 facing the second upper wall 20*b*. The second penetrating hole Sb penetrates in an arrow Z direction (vertical direction) in FIG. 7. The first penetrating holes Sa and the second penetrating holes Sb are formed along a longitudinal direction of the steering shaft 3. The first penetrating holes Sa are provided apart from the second penetrating holes Sb by the distance Lo. Accordingly, when the first absorption plate 12A and the second absorption plate 12B are disposed between the first upper wall 20*a* and the vehicle body 8 so that the base portion 15*a* of the first absorption plate 12A is sandwiched, the base portion 17*a* of the second portion 12B including the rivets 18 is disposed between the belt-like portion 15*b* of the first absorption plate 12A and the second upper wall 20*b* of the second support member 7.

Further, when the first penetrating holes Sa overlap with the first hole H1*a* formed at the first absorption plate 12A, the second penetrating holes Sb overlap with the hole H2 formed at the second absorption plate 12B and the second hole H1*b* formed at the first absorption plate 12A.

The bolt G2 is inserted into the first penetrating holes Sa. The control pin 13 serving as a connection member controlled by the pin control apparatus 14 is inserted into the second penetrating holes Sb. Then, as illustrated in FIG. 3, when the second support member 7, into which the bolt G2 and the control pin 13 have been inserted, is fitted to the thin portion 7*a*, the bolt G2 and the control pin 13 are disposed in the groove Ho formed at the thin portion 7*a*. Then, as illustrated in FIG. 3, the bolt G2 is tightened to the vehicle body 8.

The pin control apparatus 14 is fixed to the lower wall 21 of a connected body C of the second support member 7 and the thin portion 7*a* of the column housing 2*a*. The pin control apparatus 14 includes the control pin 13 movable in an upper and lower direction. The control pin 13 penetrates the second penetrating holes Sb and protruding from the second upper wall 20*b*. Then, when the control pin 13 moves upward to a position illustrated in FIG. 7, the control pin 13 engages with the second hole H1*b* provided at the first absorption plate 12A and the hole H2 provided at the second absorption plate 12B at the same time. Further, when the control pin 13 moves downward from the position illustrated in FIG. 7 to a position illustrated in FIG. 9, the control pin 13 is disengaged from the second hole H1*b* provided at the first absorption plate 12A and the hole H2 provided at the second absorption plate 12B at the same time. Accordingly, when the control pin 13 is located at the position illustrated in FIG. 7, both of the first absorption plate 12A and the second absorption plate 12B are connected to the vehicle body 8 through the control pin 13, the connected body C, and the bolt G2. Then, when the control pin 13 is located at the position illustrated in FIG. 9, only the first absorption plate 12A is connected to the vehicle body 8 through the bolt G2. At this time, the second absorption plate 12B is not connected to the vehicle body 8.

Figure 6:
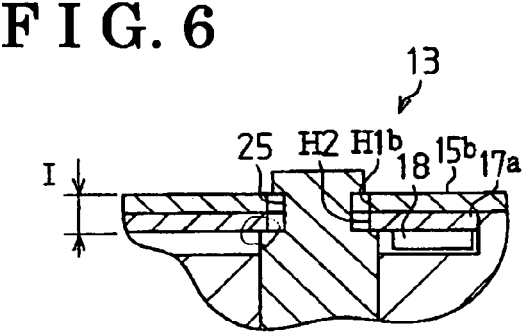
FIG. 6 represents a cross-sectional view illustrating a control pin.

FIG. 6 represents a cross-sectional view illustrating the control pin 13. As illustrated in FIG. 6, a circular groove 25 is formed at an end portion of the control pin 13. The circular groove 25 is formed to have a width I equal to or larger than a sum of the thickness t1 of the first absorption plate 12A and the thickness t2 of the second absorption plate 12B. Accordingly, when the control pin 13 is moved to the position illustrated in FIG. 7, the circular groove 25 is engaged with the second hole H1*b* and the hole H2. Therefore, the control pin 13 is prevented from disengaging from the second hole H1*b* provided at the first absorption plate 12A and the hole H2 provided at the second absorption plate 12B caused by vibrations or the like.

As illustrated in FIG. 7, the pin control apparatus 14 is electrically connected with the controller 10 (illustrated in FIG. 1) through an electric wire (not illustrated). An electromagnetic solenoid is provided inside the pin control apparatus 14. When the drive current SG is supplied from the controller 10, the solenoid is excited. Then, the pin control apparatus 14 moves the control pin 13 downward to the position illustrated in FIG. 9. On the other hand, when the drive current SG is not supplied from the controller 10, the solenoid is not excited. Then, the control pin 13 is moved upward to the position illustrated in FIG. 7.

Accordingly, in the embodiment, when the weight of the driver H is less than 80 kg, the drive current SG is supplied from the controller 10, and the control pin 13 is drawn downward. As a result, as the energy absorption member 12, only the first absorption plate 12A is connected and secured to the vehicle 8 through the bolt G2. On the other hand, when the weight of the driver H is 80 kg or more, the drive current SG is not supplied from the controller 10 and the control pin 13 is moved upward. As a result, as the energy absorption member 12, the first absorption plate 12A and the second absorption plate 12B are connected to the vehicle body 8 through the control pin 13, the connected body C, and the bolt G2.

Next, an action of the steering apparatus 1 configured as described above will be explained with reference to FIGS. 7 to 10.

FIG. 7 represents a diagram illustrating a relation between the EA pin 11 and the energy absorption member 12 before the driver H takes the driver seat S. In this condition, the drive current SG is not supplied from the controller 10 and the solenoid of the pin control apparatus 14 is not excited. Accordingly, the control pin 13 is protruding upward and engaging with the second hole H1b of the first absorption plate 12A and the hole H2 of the second absorption plate 12B. As a result, both of the first absorption plate 12A and the second absorption plate 12B are connected with the vehicle body 8.

Then, when the controller 10 judges that the weight of the driver H is 80 kg or more, the controller 10 does not supply the drive current SG. Accordingly, the solenoid of the pin control apparatus 14 is not excited, and as illustrated in FIG. 7, the control pin 13 keeps protruding upward. As a result, both of the first absorption plate 12A and the second absorption plate 12B are connected with the vehicle body 8.

Then, in this condition, when the vehicle collides with an object and the steering column apparatus 2 is detached from the vehicle body 8 and moved in a forward direction, as illustrated in FIG. 8, the EA pin 11 is moved relative to the first absorption plate 12A and the second absorption plate 12B while the EA pin 11 makes changes of shapes of the first absorption plate 12A and the second absorption plate 12B. In other words, the EA pin 11 is removed from both of the first absorption plate 12A and the second absorption plate 12B. As a result, load applied to the EA pin 11 when the EA pin 11 is removed becomes relatively large.

Accordingly, when the weight of the driver H is 80 kg or more, load applied to the steering column apparatus 2 when the steering column apparatus 2 is detached from the vehicle body 8 and moved becomes relatively large. As described above, when the weight of the driver H is relatively large, the steering apparatus 1 can sufficiently absorb impact applied to the driver H.

Figure 9:
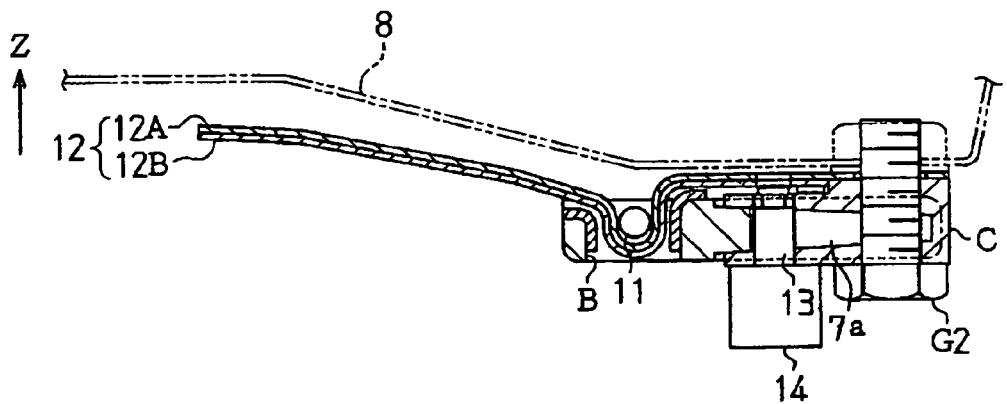
FIG. 9 represents a diagram for explaining an action of the steering apparatus according to the first embodiment of the present invention.

On the other hand, when the controller 10 judges that the weight of the driver H is less than 80 kg, the controller 10 outputs the drive current SG. Then, the solenoid of the pin control apparatus 14 is excited, and as illustrated in FIG. 9, the control pin 13 is moved downward. As a result, only the first absorption plate 12A is connected to the vehicle body 8.

Figure 10:
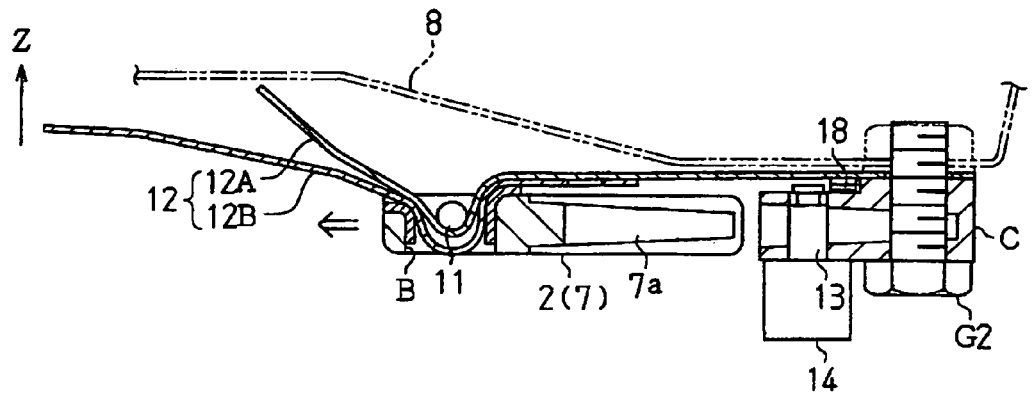
FIG. 10 represents a diagram for explaining an action of the steering apparatus according to the first embodiment of the present invention.

In this condition, when the vehicle collides with an object and the steering column apparatus 2 is detached from the vehicle body 8 and moved in a forward direction, as illustrated in FIG. 10, the second absorption plate 12B is detached from the rivets 18 and is moved in a forward direction together with the steering column apparatus 2. Then, the EA pin 11 is moved relative to only the first absorption plate 12A while the EA pin 11 makes a change of a shape of only the first absorption plate 12A. As a result, load applied to the EA pin 11 when the EA pin is removed becomes relatively small.

In other words, load applied to the EA pin 11 when the EA pin 11 is removed depends on a thickness and a width of the energy absorption plate. When the thickness and the width of the energy absorption plate become large, the load applied to the EA pin 11 when the EA pin 11 is removed becomes large. In the embodiment, the thickness of the first absorption plate 12A and that of the second absorption plate 12B are the same. The width of the second absorption plate 12B is narrower than that of the first absorption plate 12A.

Accordingly, when the weight of the driver is less than 80 kg, the load applied to the steering column 2 when the steering column apparatus 2 detached from the vehicle body 8 and moved becomes relatively small. Even when the weight of the driver H is small, the steering apparatus 1 can gently absorb the impact applied to the driver H.

In this configuration, for example, if the drive current SG is disrupted from some reasons when the vehicle collides with an object, the control pin 13 will be moved upward. In this time, because the first absorption plate 12A and the second absorption plate 12B has been already separated, the control pin 13 can engage with only the second hole H1b of the first absorption plate 12A. Accordingly, large load is not applied to the EA pin 11 when the EA pin 11 is removed. Thus, the energy absorption apparatus 9 can work safely.

Next, effects of the embodiment of the present invention will be explained.

According to the embodiment of the present invention, the energy absorption member 12 is configured from the first absorption plate 12A and the second absorption plate 12B overlapping with the first absorption plate 12A. Then, when the weight of the driver H is a standard weight or more, the control pin 13 is controlled so that the control pin 13 is removed from both the first absorption plate 12A and the second absorption plate 12B, thereby increasing the load applied to the EA pin 11 when the EA pin is removed. On the other hand, when the weight of the driver H is less than the standard weight, the control pin 13 is controlled so that the control pin 13 is removed from only the first absorption plate 12A, thereby decreasing the load applied to the EA pin 11 when the EA pin 11 is removed.

Accordingly, the load applied to the EA pin 11 when the EA pin 11 is removed can be controlled by only driving and controlling the control pin 13 corresponding to the weight of the driver H. Therefore, the energy absorption apparatus 9 can be simply configured.

According to the embodiment, in the pin control apparatus 14, the control pin 13 is driven and controlled by means of the solenoid. Accordingly, electronic configurations of the pin control apparatus 14 can be simple. Therefore, the pin control apparatus 14 can be smaller size. Further, the pin control apparatus 14 can be manufactured at lower cost. As a result, the steering apparatus also can be manufactured at lower cost.

According to the embodiment of the present invention, in the steering apparatus 1 including the tilt mechanism C1 and the telescopic mechanism C2, the energy absorption apparatus 9 can be smaller size.

According to the embodiment of the present invention, because the EA pin 11, the first absorption plate 12A, and the second absorption plate 12B are provided at each side of the column housing 2a, when the vehicle collides with an object, balance between load applied to the EA pin 11 provided at right side and load applied to the EA pin 11 provided at left side when the EA pins 11 are removed can be preferably maintained. Alternately, an EA pin 11 and a first absorption plate 12A and a second absorption plate 12B can be provided at a center of the column housing 2a.

Figure 11:
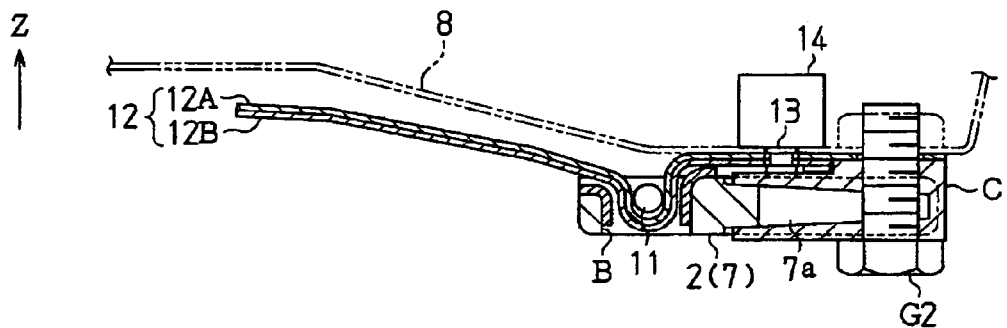
FIG. 11 represents a diagram for explaining an action of a steering apparatus according to a second embodiment of the present invention.

Next, a second embodiment of the present invention will be explained with reference to FIG. 11. In the second embodiment, same configuration members will be numbered as same as in the first embodiment, and detailed descriptions of the same configuration members will be skipped. FIG. 11 represents a diagram illustrating a relation between the control pin 13 and the energy absorption member 12 according to the second embodiment of the present invention.

As illustrated in FIG. 11, the pin control apparatus 14 is assembled to the vehicle body 8 according to the second embodiment of the present invention. Then, the control pin 13 is inserted from the vehicle body 8 side toward the second upper wall 20b of the connected body C and configured to contact with the second upper wall 20b according to the second embodiment of the present invention. Further, in the pin control apparatus 14 according to the second embodiment of the present invention, when the solenoid is excited, the control pin 13 is moved upward (an arrow Z direction in FIG. 11). On the other hand, when the solenoid is not excited, the control pin 13 is moved downward (an inversed direction of the arrow Z direction in FIG. 11).

Figure 12:
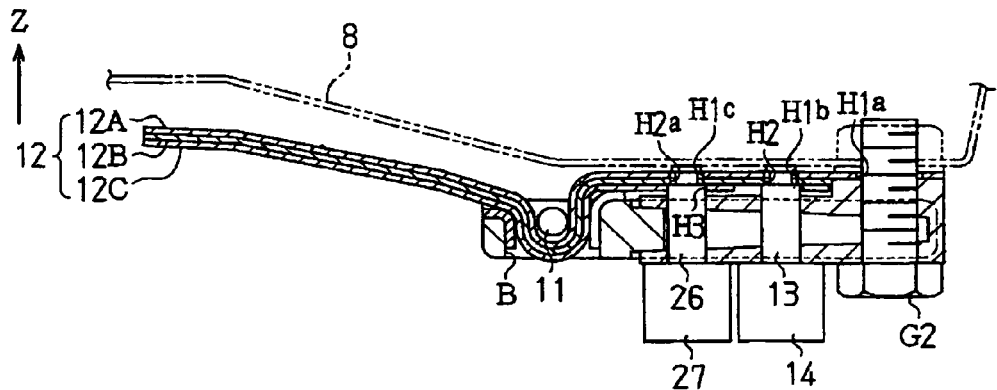
FIG. 12 represents a diagram for explaining an action of a steering apparatus according to a third embodiment of the present invention.

Next, a third embodiment of the present invention will be explained with reference to FIG. 12. In the third embodiment, same configuration members are numbered as same as in the first embodiment, and detailed descriptions of the same configuration members will be skipped. FIG. 12 represents a diagram illustrating a relation between the control pin 13 and the energy absorption member 12 according to the third embodiment of the present invention.

As illustrated in FIG. 12, in the third embodiment, the energy absorption member 12 is configured from three absorption plates, that is, the first absorption plate 12A, the second absorption plate 12B, and a third absorption plate 12C. Then, the first absorption plate 12A includes the first hole H1a, the second hole H1b and a third hole H1c formed at the front of the hole H2b. Further, the second absorption plate 12B includes the hole H2 and a hole H2a formed at the front of the hole H2. Further, the third absorption plate 12C includes a base portion and a hole H3 formed at the base portion. Then, when the first absorption plate 12A, the second absorption plate 12B, and the third absorption plate 12C are overlapped together, as illustrated in FIG. 12, the hole H3 of the third absorption plate 12C is disposed so as to face the hole H2a of the second absorption plate 12B.

In addition, a second pin control apparatus 27 is secured on the lower wall 21 of the second support member 7. The second pin control apparatus 27 controls and moves a control pin 26 in upper and lower direction. The control pin 26 is inserted into the hole H2a of the second absorption plate 12B and the hole H3 of the third absorption plate 12C. The second pin control apparatus 27 is connected to the controller 10 for inputting a drive current SG corresponding to the weight of the driver H.

Configured as described above, for example, by protruding the two control pins 13 and 26 simultaneously, the EA pin 11 can be removed from three absorption plates 12A, 12B, and 12C while the EA pin 11 changes shapes of the three absorption plates 12A, 12B, and 12C. As a result, it can be effective when load applied to the EA pin 11 when the EA pin 11 is removed need to be larger. In other words, by controlling the two control pins 13 and 26, the number of the absorption plates from which the EA pin 11 is removed can be varied, thereby varying the load applied to the EA pin 11 when the EA pin 11 is removed in wider variety.

In addition, embodiments of the present invention are not limited to above described embodiments. Variations can be employed as follows.

In the embodiment described above, the EA pin 11 and the energy absorption member 12 were provided at each side of the column housing 2 (right and left side). The energy absorption member 12 was configured from layers of two absorption plates, that is, the first absorption plate 12A and the second absorption plate 12B. Alternately, the energy absorption member 12 can be configured from one absorption plate. In this case, the EA pin 11 is removed from only either one of the absorption plates corresponding to the weight of the driver H. The steering apparatus configured like that can control the load applied to the EA pin 11 when the EA pin 11 is removed corresponding to the weight of the driver H.

In the embodiments described above, the control pin 13 was moved upward or downward to control the number of the absorption plates from which the EA pin 11 is removed corresponding to the weight of the driver H as a drive condition. However, it is not limited. The number of the absorption plates from which the EA pin 11 is removed can be controlled corresponding to whether a seat belt is applied to the driver H or not. Further, the number of the absorption plates from which the EA pin 11 is removed can be controlled by a camera provided in the vehicle for judging a figure of the driver corresponding to a result of judging the figure. Further, the number of the absorption plates from which the EA pin 11 is removed can be controlled corresponding to a speed of the vehicle.

In the embodiment described above, the steering apparatus 1 included the tilt mechanism C1 and the telescopic mechanism C2. However, it is not limited. The present invention can also be applied to a steering apparatus including neither a tilt mechanism C1 nor a telescopic mechanism C2. The present invention can also be applied to a steering apparatus including either a tilt mechanism C1 or a telescopic mechanism C2.

Figure 13:
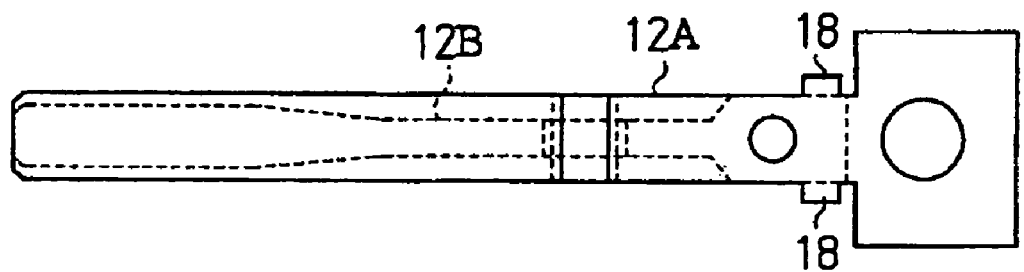
FIG. 13 represents a diagram for explaining another example of an energy absorption apparatus.

In the embodiment described above, the belt-like portion 17b of the second absorption plate 12B had a uniform width. However, it is not limited. As illustrated in FIG. 13, the width of the belt-like portion 17b of the second absorption plate 12B can be gradually changed. Configured like that, load applied to the steering column apparatus 2 can be changed corresponding to a moved distance of the steering column apparatus 2 when the vehicle collides with an object.

Figure 14:
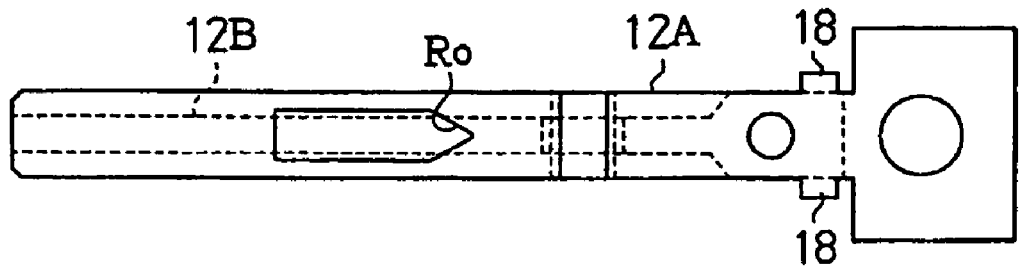
FIG. 14 represents a diagram for explaining another example of an energy absorption apparatus.

Further, as illustrated in FIG. 14, by providing a hole Ro at the belt-like portion 15b of the first absorption plate 12A, load applied to the EA pin 11 when the EA pin 11 is removed from the first absorption plate 12A can be changed corresponding to a moved distance when the vehicle collides with an object.

Next, another technical concept which can be grasped on the basis of the embodiments of the present invention described above will be mentioned.

An energy absorbing steering apparatus for a vehicle, comprising a support member for supporting a steering column by detachably attaching the steering column to a vehicle body and an energy absorption apparatus for relatively movably supporting the steering column relative to the vehicle body in a frontward direction of the vehicle body, and for absorbing impact energy applied to the steering column, the energy absorption apparatus comprising a support pin provided each right and left side of the steering column and supported by the steering column, an absorption member provided along the support pin provided each right and left side of the steering column and having a connection portion provided at one end of the absorption member and connected to the vehicle body for applying load to the support pin when the support pin moves relative to the support member, a connection member connected to the connection portion of the absorption member provided along the support pin for connecting the absorption member to the vehicle body, and a control apparatus for controlling the connection member to connect either one of the connection portion of the absorption member to the vehicle body corresponding to a drive condition.

According to another technical concept described above, the amount of absorbed impact energy applied to the steering column can be controlled by selecting whether to connect either one of each absorption member provided each right and left side of the support member with the vehicle or to connect both of each absorption member with the vehicle corresponding to the drive condition.

According to a first aspect of the present invention, an energy absorbing steering apparatus for a vehicle includes a support member for supporting a steering column by detachably attaching the steering column to a vehicle body and an energy absorption apparatus for relatively movably supporting the steering column relative to the vehicle body in a frontward direction of the vehicle body. The energy absorbing apparatus is designed for absorbing impact energy applied to the steering column. The energy absorption apparatus includes a support pin supported by the steering column, a first absorption member provided along the support pin and having a connection portion provided at one end of the first absorption member and connected to the vehicle body for applying load to the support pin when the support pin moves relative to the support member, a second absorption member provided along the support pin and having a connection portion provided at one end of the second absorption member and connected to the vehicle body for applying load to the support pin when the support pin moves relative to the support member, a connection member connected to the connection portion of the first absorption member and the connection portion of the second absorption member for connecting the first absorption member and the second absorption member to the vehicle body, and a control apparatus for controlling the connection member to change the number of absorption members connected to the vehicle body corresponding to a drive condition.

According to a second aspect of the present invention, in the energy absorbing steering apparatus for a vehicle according to the first aspect of the present invention, the support pin is provided at each right side and left side of the support member, and the first absorption member and the second absorption member are provided along the support pin provided at each right side and left side of the support member.

According to a third aspect of the present invention, in the energy absorbing steering apparatus for a vehicle according to the first aspect of the present invention, the first absorption member includes a first plate of belt-like shape, the second absorption member includes a second plate of belt-like shape, the connection member is two holes, one provided at the first plate and the other provided at the second plate, the first plate and the second plate are overlapped so that the hole provided at the first plate and the hole provided at the second plate are overlapped together, and the connection member includes a control pin for connecting the first plate and the second plate to the vehicle body by being inserted into and engaging with the hole provided at the first plate and the hole provided at the second plate.

According to a fourth aspect of the present invention, in the energy absorbing steering apparatus for a vehicle according to the third aspect of the present invention, the first plate is connected to the vehicle body through a connection bolt, and the second plate is fastened to the first plate by a rivet provided at the first plate.

According to a fifth aspect of the present invention, the energy absorbing steering apparatus for a vehicle according to the first aspect of the present invention further includes a detection means provided at the vehicle body for detecting the drive condition. The control apparatus controls a position of the connection member corresponding to the drive condition detected by the detection means.

According to a sixth aspect of the present invention, in the energy absorbing steering apparatus for a vehicle according to the fifth aspect of the present invention, the detection means detects a weight of a driver driving the vehicle.

According to the first aspect of the present invention, the control apparatus changes the number of absorption members connected with the vehicle body corresponding to the drive condition. Accordingly, for example, when a weight of a driver is employed as the drive condition, the control member connects increased number of absorption members with the vehicle body when the weight of the driver is heavy. On the other hand, the control member connects one or decreased number of absorption members with the vehicle body when the weight of the driver is light. Therefore, when increased number of absorption member is connected, load applied to the support pin when the support pin is removed becomes larger. Accordingly, when the weight of the driver is heavy, the energy absorbing steering apparatus can sufficiently absorb the impact energy. On the other hand, when the weight of the driver is light, the energy absorbing steering apparatus can gently absorb the impact energy. Accordingly, an energy absorbing steering apparatus, in which the amount of impact energy absorbed can be controlled corresponding to the drive condition, of relatively simple configuration can be provided.

According to the second aspect of the present invention, because the support pin and absorption members are provided at each side of the support member, load applied to each right and left side of the support member when the support pin is removed can be preferably maintained.

According to the third aspect of the present invention, the control pin is inserted into the holes provided at the first plate and the second plate. Thus, the first plate and the second plate are connected with the vehicle body. Accordingly, the load applied to the support pin when the support pin is removed can be controlled.

According to the fourth aspect of the present invention, the first absorption member and the second absorption member can be supported as a unit.

According to the fifth aspect of the present invention, the control apparatus connects a predetermined number of absorption members to the vehicle body corresponding to the drive condition detected by the detection means. Accordingly, when the detection means is configured to detect the weight of the driver, the control apparatus can connect the predetermined number of absorption members to the vehicle body corresponding to the weight of the driver.

According to the sixth aspect of the present invention, the predetermined number of absorption members are connected to the vehicle corresponding to the weight of the driver. Accordingly, the amount of impact energy absorbed by the absorption plate can be controlled corresponding to the weight of the driver.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. An energy absorbing steering apparatus for a vehicle, comprising:
    a support member for supporting a steering column by detachably attaching the steering column to a vehicle body; and
    an energy absorption apparatus for relatively movably supporting the steering column relative to the vehicle body in a frontward direction of the vehicle body, and for absorbing impact energy applied to the steering column, the energy absorption apparatus comprising:
    a support pin supported by the steering column;
    a first absorption plate provided along the support pin and having a connection portion provided at one end of the first absorption plate, and the first absorption plate connected to the vehicle body for applying load to the support pin when the support pin moves relative to the support member;
    a second absorption plate provided along the support pin to overlap with the first absorption plate in the thickness direction, the second absorption plate having a connection portion provided at one end of the second absorption plate, and the second absorption plate connected to the vehicle body for applying load to the support pin when the support pin moves relative to the support member;
    a connection member connected to both the connection portion of the first absorption plate and the connection portion of the second absorption plate for connecting both the first absorption plate and the second absorption plate to the vehicle body; and
    a control apparatus for controlling the connection member to change the number of the absorption plates connected to the vehicle body in response to a drive condition.

2. The energy absorbing steering apparatus for a vehicle according to claim 1, wherein
    the support pin is provided at each right side and left side of the support member, and the first absorption plate and the second absorption plate are provided along the support pin provided at each right side and left side of the support member.

3. The energy absorbing steering apparatus for a vehicle according to claim 1, wherein
    the first and second absorption plates have a belt-like shape, respectively, the connection portion provided at the first absorption plate is a first hole, the connection portion provided at the second absorption plate is a second hole, the first and second holes overlap each other, and the connection member includes a control pin for connecting the first and second absorption plates to the vehicle body by being inserted into and engaging with the first and the second holes.

4. The energy absorbing steering apparatus for a vehicle according to claim 3, wherein the first absorption plate is connected to the vehicle body through a connection bolt, and the second absorption plate is fastened to the first absorption plate by a rivet provided at the first absorption plate.

5. The energy absorbing steering apparatus for a vehicle according to claim 3, further comprising:
    a detection means provided at the vehicle body for detecting the drive condition, wherein
    the control apparatus controls a position of the connection member in response to the drive condition detected by the detection means.

6. The energy absorbing steering apparatus for a vehicle according to claim 3, further comprising:
    a detection means for detecting a weight of a driver driving the vehicle, wherein
    the first absorption plate is connected to the vehicle body through a connection bolt, the control apparatus controls the control pin to connect both the connection portion provided at the first absorption plate and the connection portion provided at the second absorption plate to the vehicle body when the weight of the driver detected by the detection means is a standard weight or more, and the control apparatus controls the control pin to disconnect the connection portion provided at the second absorption plate from the vehicle body when the weight of the driver detected by the detection means is less than the standard weight.

7. The energy absorbing steering apparatus for a vehicle according to claim 6, wherein
    the first absorption plate includes a rivet for fastening the second absorption plate, the fastening by the rivet is unfastened when a predetermined level of impact or more is applied to the steering column, and the second absorption plate is detached from the first absorption plate by the impact applied to the steering column when the weight of the driver is less than the standard weight.

8. The energy absorbing steering apparatus for a vehicle according to claim 1, further comprising:
    a detection means provided at the vehicle body for detecting the drive condition, wherein
    the control apparatus controls a position of the connection member in response to the drive condition detected by the detection means.

9. The energy absorbing steering apparatus for a vehicle according to claim 8, wherein
    the detection means detects a weight of a driver driving the vehicle.

10. The energy absorbing steering apparatus for a vehicle according to claim 8, wherein
    the control apparatus controls the connection member so that the number of the absorption members connected to the vehicle body when a weight of a driver detected by the detection means is less than a standard weight becomes smaller than the number of absorption members connected to the vehicle body when the weight of the driver detected by the detection means is the standard weight or more.

11. The energy absorbing steering apparatus for a vehicle according to claim 1, wherein the connection portion provided at the first absorption plate is a first through hole, the connection portion provided at the second absorption plate is a second through hole, the first and second through holes overlap each other.

12. The energy absorbing steering apparatus for a vehicle according to claim 11, wherein the control apparatus controls the connection member to move in the thickness direction of the first and second absorption plates through the first and second through holes.

13. An energy absorbing steering apparatus for a vehicle, comprising:
    a support member for supporting a steering column by detachably attaching the steering column to a vehicle body; and
    an energy absorption apparatus for relatively movably supporting the steering column relative to the vehicle body in a frontward direction of the vehicle body, and for absorbing impact energy applied to the steering column, the energy absorption apparatus comprising:

a support pin supported by the steering column, a first absorption plate engaged with the support pin and having a connection portion provided at one end of the first absorption plate, and the first absorption plate connected to the vehicle body for applying load to the support pin when the support pin moves relative to the support member, a second absorption plate engaged with the support pin to overlap with the first absorption plate in the thickness direction, the second absorption plate having a connection portion provided at one end of the second absorption plate, and the second absorption plate connected to the vehicle body for applying load to the support pin when the support pin moves relative to the support member, a connection member connected to both the connection portion of the first absorption plate and the connection portion of the second absorption plate for connecting both the first absorption plate and the second absorption plate to the vehicle body, and a control apparatus for controlling the connection member to change the number of the absorption plates connected to the vehicle body in response to a drive condition.

* * * * *